(12) United States Patent
Mandai et al.

(10) Patent No.: US 8,107,136 B2
(45) Date of Patent: Jan. 31, 2012

(54) IMAGE FORMING APPARATUS

(75) Inventors: Hidenobu Mandai, Osaka (JP); Takashi Kikutani, Osaka (JP); Kazuhisa Yoneda, Osaka (JP); Hiroyuki Nagao, Osaka (JP); Shigenori Morimoto, Osaka (JP); Yasushi Nakamura, Osaka (JP); Yoshiya Kinoshita, Osaka (JP); Kazuhiro Matsuyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 282 days.

(21) Appl. No.: 12/436,923

(22) Filed: May 7, 2009

(65) Prior Publication Data

US 2009/0279146 A1 Nov. 12, 2009

(30) Foreign Application Priority Data

May 12, 2008 (JP) .................................. 2008-124159

(51) Int. Cl.
*H04N 1/04* (2006.01)
(52) U.S. Cl. ......... 358/474; 358/468; 358/496; 358/497
(58) Field of Classification Search .................. 358/474, 358/468, 496, 497, 498
See application file for complete search history.

(56) References Cited

U.S. PATENT DOCUMENTS

| | | | |
|---|---|---|---|
| 7,405,926 B2 | 7/2008 | Wu et al. | |
| 2001/0033396 A1* | 10/2001 | Sheng | 358/468 |
| 2003/0179390 A1 | 9/2003 | Kitozaki | |
| 2007/0123322 A1 | 5/2007 | Mizushina | |

FOREIGN PATENT DOCUMENTS

| | | |
|---|---|---|
| JP | H01-270066 A | 10/1994 |
| JP | 09-160696 | 6/1997 |
| JP | 11-127294 | * 11/1999 |
| JP | 2001-245087 A | 9/2001 |
| JP | 2001-337501 A | 12/2001 |
| JP | 2002-171372 A | 6/2002 |
| JP | 2002-229292 A | 8/2002 |
| JP | 2003-101705 A | 4/2003 |
| JP | 2003-283727 A | 10/2003 |
| JP | 2004-279692 A | 10/2004 |
| JP | 2005-094063 A | 4/2005 |
| JP | 2005-173174 A | 6/2005 |
| JP | 2005-173175 | 6/2005 |
| JP | 2005-227634 A | 8/2005 |
| JP | 2005-229195 A | 8/2005 |
| JP | 2005-354573 A | 12/2005 |
| JP | 2006-302245 | 11/2006 |
| JP | 2007-179525 | 7/2007 |

* cited by examiner

*Primary Examiner* — Houshang Safaipour
(74) *Attorney, Agent, or Firm* — Renner, Otto, Boisselle & Sklar, LLP

(57) ABSTRACT

An image reading device includes an image reading section, a frame, and an operating unit. The image reading section is configured to obtain image data by reading an image carried on a document. The frame supports the image reading section. The operating unit has an operating section including a plurality of input keys adapted to receive an input operation for controlling the image reading section, and an operating unit body supporting the operating section for displacement between a drawn-out position in which the input keys are exposed to outside and a housed position in which the input keys are housed inside. The operating unit is supported by the frame.

3 Claims, 7 Drawing Sheets

IMAGE FORMING APPARATUS

CROSS REFERENCE

This Nonprovisional application claims priority under 35 U.S.C. §119(a) on Patent Application No. 2008-124159 filed in Japan on May 12, 2008, the entire contents of which are hereby incorporated by reference.

BACKGROUND OF THE INVENTION

The present invention relates to an image reading device provided with an operating section adapted to receive an input operation for controlling an image reading section, as well as an image forming apparatus having such an image reading device.

An image reading device includes an image reading section configured to obtain image data by reading an image carried on a document, and an operating section including a plurality of input keys.

With diversifying functions of image reading devices in recent years, input operations tend to become complicated. One conceivable approach to obviate such an inconvenience is to increase the number of input keys in an operating section, thereby to simplify the input operations. In an arrangement wherein the operating section is mounted on top of an image reading section as in a conventional image reading device, however, an area that can be provided for the operating section is made narrow to limit growth in the size of the image reading device and, hence, it has been difficult to place a sufficient number of input keys in the operating section.

Among mobile electronic devices, on the other hand, there is one which is configured to allow a ten-key pad case to be drawn out relative to a full-keyboard case, thereby to expose the ten-key pad case, as disclosed in Japanese Patent Laid-Open Publication No. 2007-179525 for example. This configuration makes it possible to use the ten-key pad along with the full-keyboard by drawing out the ten-key pad case when necessary.

With the conventional image reading device, however, if the operating section is rendered capable of being drawing out and placed closer to an edge portion, vibrations caused by input keys of the operating section depressed by an input operation are sometimes turned into larger vibrations by the principle of leverage, which are then transmitted to the image reading section because the operating section is supported on the image reading section. If such vibrations are transmitted to the image reading section, the image reading precision lowers. The configuration described in Japanese Patent Laid-Open Publication No. 2007-179525 is not made by giving consideration to a technique of suppressing transmission of vibrations caused by depression of the operating section.

A feature of the present invention is to provide an image reading device and an image forming apparatus which allow the number of input keys to be increased while suppressing transmission of vibrations to the image reading section and limiting the growth in the size of the image reading device.

SUMMARY OF THE INVENTION

An image reading device according to the present invention includes an image reading section, a frame, and an operating unit. The image reading section is configured to obtain image data by reading an image carried on a document. The frame supports the image reading section. The operating unit has an operating section including a plurality of input keys adapted to receive an input operation for controlling the image reading section, and an operating unit body supporting the operating section for displacement between a drawn-out position in which is the input keys are exposed to outside and a housed position in which the input keys are housed inside. The operating unit is supported by the frame.

Since the operating section is displaceable between the drawn-out position and the housed position, this arrangement allows the operating section to coexist with an input section fixedly placed on top. For this reason, it is possible to increase the number of input keys while limiting the growth in the size of the image reading device, thereby to simplify the input operation. The operating unit is supported not by the image reading section but by the frame. Therefore, it is not likely that vibrations caused by depression of input keys of the operating section are transmitted to the image reading section.

The foregoing and other features and attendant advantages of the present invention will become more apparent from the reading of the following detailed description of the invention in conjunction with the accompanying drawings.

BRIEF DESCRIPTION OF THE DRAWINGS

FIG. 7A shows a keyboard tray in a drawn-out position, while FIG. 7B shows the keyboard tray in a housed position.

DETAILED DESCRIPTION OF THE INVENTION

Figure 1:
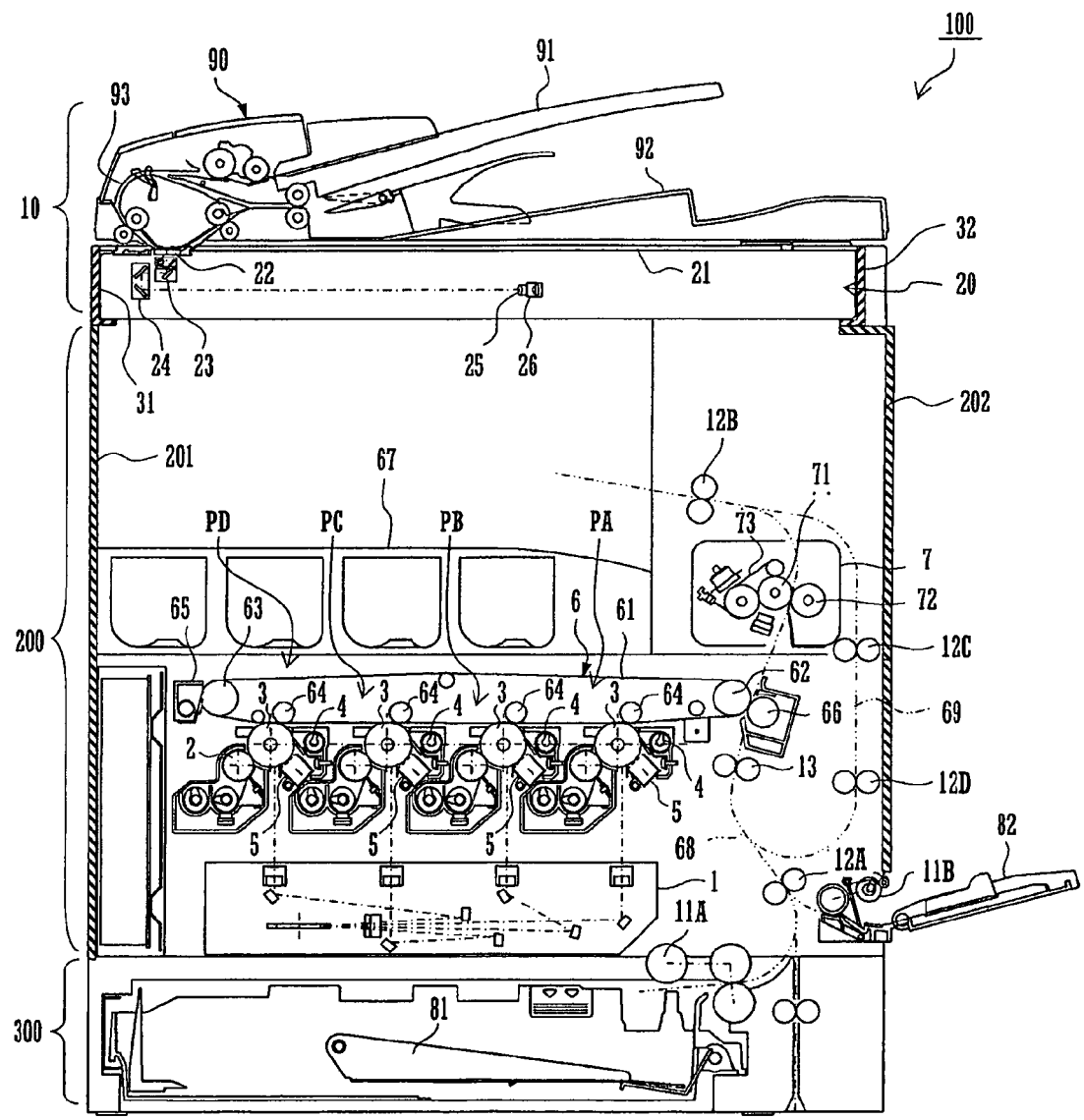
FIG. 1 is a sectional front elevational view showing an image forming apparatus including an image reading device according to an embodiment of the present invention.

Hereinafter, the best mode for carrying out the present invention will be described with reference to the drawings. FIG. 1 is a sectional front elevational view showing an image forming apparatus 100 including an image reading device 10 according to an embodiment of the present invention. In FIG. 1, only a part of the section is hatched.

The image forming apparatus 100 includes, in addition to the image reading device 10, an image forming unit 200 and a sheet feeding unit 300.

The image reading device 10 includes an automatic document feeder (ADF) 90 and an image reading section 20. The image reading section 20 is provided with a first platen 21, a second platen 22, a first mirror base 23, a second mirror base 24, a lens 25, and a solid-state image sensor (CCD: Charge Coupled Device) 26.

The ADF 90 defines a document feed path 93 extending from a document tray 91 to a delivery tray 92 via the second platen 22. The ADF 90 feeds document sheets one by one into the document feed path 93. The ADF 90 is rendered pivotable about its rear side so as to cover the top surface of the first platen 21 openably. When the top surface of the first platen 21 is exposed by turning the ADF 90 so as to move the front side thereof upwardly, a document sheet can be placed on the first platen 21 manually.

The first and second platens 21 and 22 each comprise a hard glass plate.

The first mirror base 23 and the second mirror base 24 are horizontally movable below the first and second platens 21 and 22. The traveling speed of the second mirror base 24 is ½ as high as that of the first mirror base 23. The first mirror base 23 carries a light source and a first mirror thereon. The second mirror base 24 carries a second mirror and a third mirror thereon.

In reading an image carried on a document sheet fed by the ADF 90, the first mirror base 23 is at rest below the second platen 22. Light from the light source is directed toward the image carrying side of the document sheet passing over the second platen 22, and reflected light from the image carrying side of the document sheet is reflected by the first mirror toward the second mirror base 24.

In reading an image carried on a document sheet placed on the first platen 21, the first and second mirror bases 23 and 24 move horizontally below the first platen 21. Light from the light source is directed toward the image carrying side of the document sheet placed on the first platen 21, and reflected light from the image carrying side of the document sheet is reflected by the first mirror toward the second mirror base 24.

Reflected light from the image carrying side of a document sheet passes along an optical path length which is fixed irrespective of whether or not the ADF 90 is used, and becomes incident on the CCD 26 through the lens 25 by means of the second and third mirrors.

The CCD 26 outputs electric signals in accordance with quantities of light reflected by the image carrying side of a document sheet. Such electric signals are inputted as image data to a non-illustrated control section. In this way, the image reading section 20 obtains image data by reading the image carried on a document sheet. The control section outputs image data to the image forming unit 200 when necessary.

The image forming unit 200 includes an exposure unit 1, four developing devices 2, four photosensitive drums 3, four cleaning units 4, four electrostatic charger devices 5, an intermediate transfer belt 61, four primary transfer rollers 64, a secondary transfer roller 66, a fixing device 7, a catch tray 67, sheet feed paths 68 and 69, and body frames 201 and 202.

The image forming unit 200 is configured to form an image by using image data items corresponding to respective of four colors including the three subtractive primary colors: cyan, magenta and yellow, obtained by color separation of a color image, and black at image forming sections PA, PB, PC and PD. The image forming sections PA to PD are arranged in a row along the intermediate transfer belt 61. The image forming sections PA to PD are identical in structure with each other.

The image forming section PA associated with black includes the developing device 2, photosensitive drum 3, cleaning unit 4, electrostatic charger device 5, and primary transfer roller 64.

The electrostatic charger device 5 electrostatically charges a surface of the photosensitive drum 3 to a predetermined potential uniformly.

The exposure unit 1 includes a semiconductor laser, a polygon mirror and first and second fθ lenses, any one of which is not shown. The exposure unit 1 irradiates the photosensitive drum 3 of each of the image forming sections PA to PD with a laser beam modulated in accordance with an associated one of the black, cyan, magenta and yellow image data items. Thus, the four photosensitive drums PA to PD each form an electrostatic latent image in accordance with a respective one of the black, cyan, magenta and yellow image data items.

The developing device 2 supplies a black toner to the surface of the photosensitive drum 3 on which the electrostatic latent image is formed, thereby visualizing the electrostatic latent image into a developer image.

The cleaning unit 4 collects residual toner remaining on the surface of the photosensitive drum 3 after the developing operation and after an image transfer operation.

The intermediate transfer belt 61 is entrained about a driving roller 62 and a driven roller 63 to form a loop-shaped travel path. The intermediate transfer belt 61 has an outer peripheral surface which comes to face the four photosensitive drums 3 sequentially. The primary transfer rollers 64 are opposed to the respective photosensitive drums 3 across the intermediate transfer belt 61. The positions at which the intermediate transfer belt 61 faces the photosensitive drums 3 are primary transfer positions.

The primary transfer rollers 64 are each applied with a primary transfer bias having a polarity opposite to the polarity of electrostatically charged toner under constant voltage control in order to transfer the developer image carried on the surface of each photosensitive drum 3 to the intermediate transfer belt 61. Thus, the developer images of the respective colors formed on the respective photosensitive drums 3 are transferred to the outer peripheral surface of the intermediate transfer belt 61 so as to be superimposed upon one another, thereby forming a full-color developer image on the outer peripheral surface of the intermediate transfer belt 61.

When image data items corresponding to some of yellow, magenta, cyan and black are inputted, only those photosensitive drums 3 which are associated with the colors corresponding to the respective image data items thus inputted form electrostatic latent images and then their respective developer images. In a monochrome printing mode, for example, only the photosensitive drum 3 associated with black forms an electrostatic latent image and then its developer image, while the outer peripheral surface of the intermediate transfer belt 61 receives only the black developer image transferred thereto.

In full-color image formation in which all the image forming sections PA to PD form respective images, the four primary transfer rollers 64 press the intermediate transfer belt 61 against all the photosensitive drums 3. On the other hand, in monochrome image formation in which only the image forming section PA forms an image, only the primary transfer roller 64 of the image forming section PA presses the intermediate transfer belt 61 against the associated photosensitive drum 3.

Each of the primary transfer rollers 64 comprises a shaft of a metal material (e.g., stainless steel) having a diameter of 8 to 10 mm, and an electrically conductive elastic material coating the surface of the shaft. The intermediate transfer belt 61 is uniformly applied with a high voltage through the electrically conductive elastic material. The elastic material comprises EPDM rubber (ethylene propylene diene M-class rubber), urethane foam, or the like.

By rotation of the intermediate transfer belt 61, the developer image transferred to the outer peripheral surface of the intermediate transfer belt 61 at each primary transfer position is moved to a secondary transfer position at which the intermediate transfer belt 61 and the secondary transfer roller 66 face each other. During image formation, the secondary transfer roller 66 is pressed against the outer peripheral surface of the intermediate transfer belt 61 at a predetermined nip pressure, with an inner peripheral surface of the intermediate transfer belt 61 being in contact with the periphery of the driving roller 62.

When a recording sheet fed from the sheet feeding unit 300 passes through the secondary transfer position, the secondary transfer roller 66 is applied with a high voltage having a polarity opposite to the polarity of electrostatically charged toner. Thus, the developer image is transferred from the outer peripheral surface of the intermediate transfer belt 61 to a surface of the recording sheet as an exemplary recording medium.

Residual developer remaining on the intermediate transfer belt 61 after transfer of the developer image to the recording sheet is collected by an intermediate transfer belt cleaning device 65.

The recording sheet carrying the developer image thus transferred thereto is guided to the fixing device 7 and then heated and pressurized by passing between a heating roller 71 and a pressurizing roller 72. Thus, the developer image is firmly fixed to the surface of the recording sheet. The recording sheet carrying the developer image fixed thereto is delivered onto the catch tray 67.

The sheet feed path 68 is provided with a plurality of feed rollers 12A and 12B. The sheet feed path 68 extends substantially vertically for feeding each recording sheet held in a sheet feed cassette 81 of the sheet feeding unit 300 to the catch tray 67 by way of the secondary transfer position and the fixing device 7.

The sheet feed path 69 is provided with a plurality of feed rollers 12C and 12D. The sheet feed path 69 extends from a location downstream of the fixing device 7 to a location upstream of the secondary transfer position in the sheet feed direction. A recording sheet having passed through the fixing device 7, which is guided into the sheet feed path 69 without being delivered to the catch tray 67, is fed on the sheet feed path 69 in a state in which its edge having been oriented backward is now oriented forward. By so doing, the recording sheet turned upside down is fed to the secondary transfer position again.

The sheet feeding unit 300 includes a manual feed tray 82 in addition to the sheet feed cassette 81. Recording sheets are held in each of the sheet feed cassette 81 and the manual feed tray 82.

The sheet feeding unit 400 feeds recording sheets one by one from the sheet feed cassette 81 or the manual feed tray 82. Each of the recording sheets accommodated in the sheet feed cassette 81 is picked up by a pickup roller 11A and then fed to the secondary transfer position through the sheet feed path 68. Each of the recording sheets held in the manual feed tray 82 is picked up by a pickup roller 11B and then fed to the secondary transfer position through the sheet feed path 68.

A registration roller 13 is located upstream of the secondary transfer position in the sheet feed direction. The leading edge of the recording sheet fed from the sheet feed cassette 81 or the manual feed tray 82 comes to abut against the registration roller 13 in a stationary state. The registration roller 13 has a rotating shaft extending in a direction perpendicular to the sheet feed direction. By allowing the leading edge of the recording sheet to abut against the registration roller 13 in a stationary state, skew correction is made when the recording sheet is positioned askew.

The registration roller 13 starts rotating in a manner timed to allow the leading edge of the recording sheet to meet the leading edge of the developer image formed on the surface of the intermediate transfer belt 61, to feed the recording sheet to the secondary transfer position. After the developer image has been transferred and fixed to the recording sheet, the recording sheet is delivered onto the catch tray 67.

Figure 2:
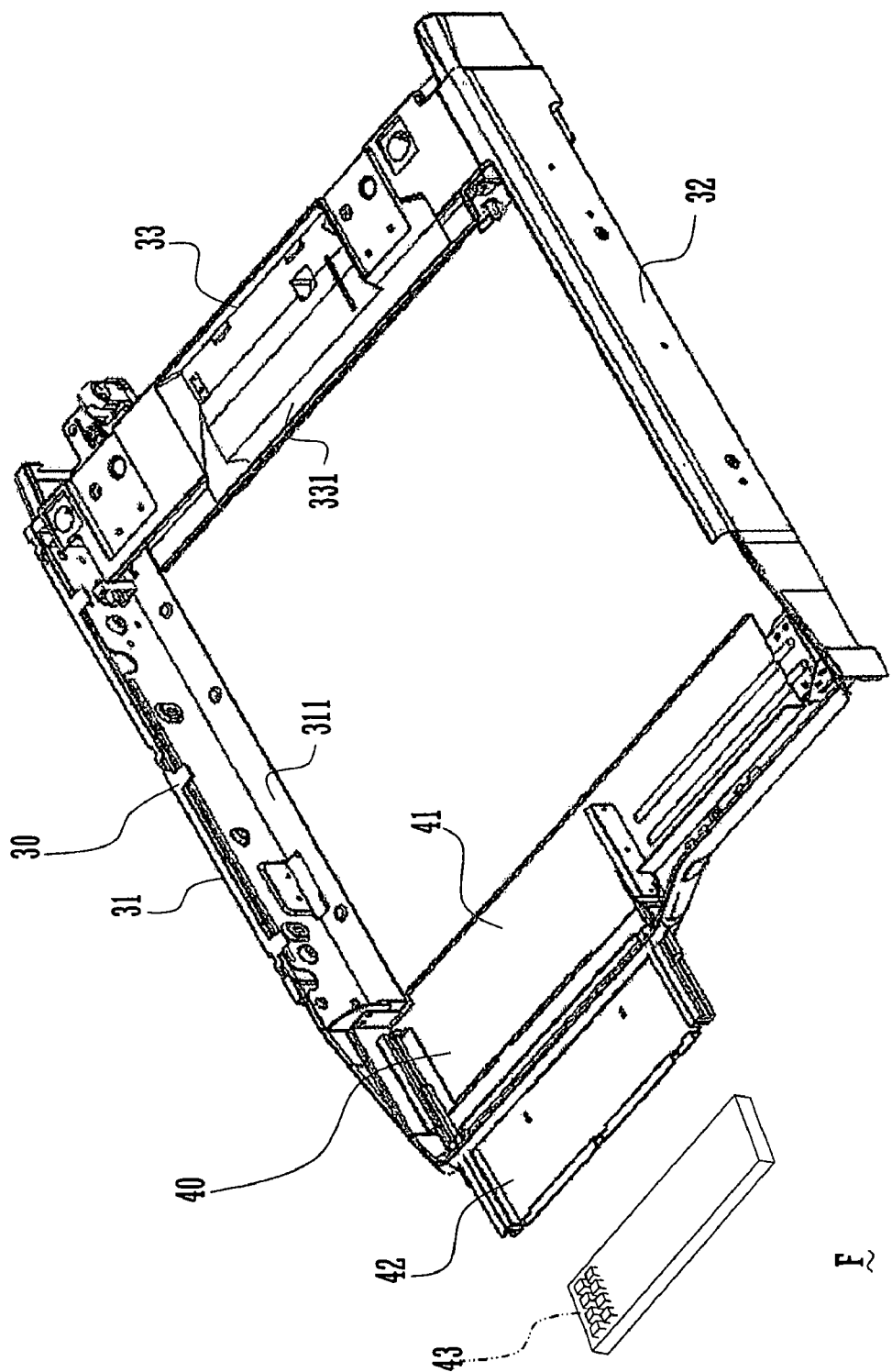
FIG. 2 is a perspective view showing a frame and an operating unit.
Figure 3:
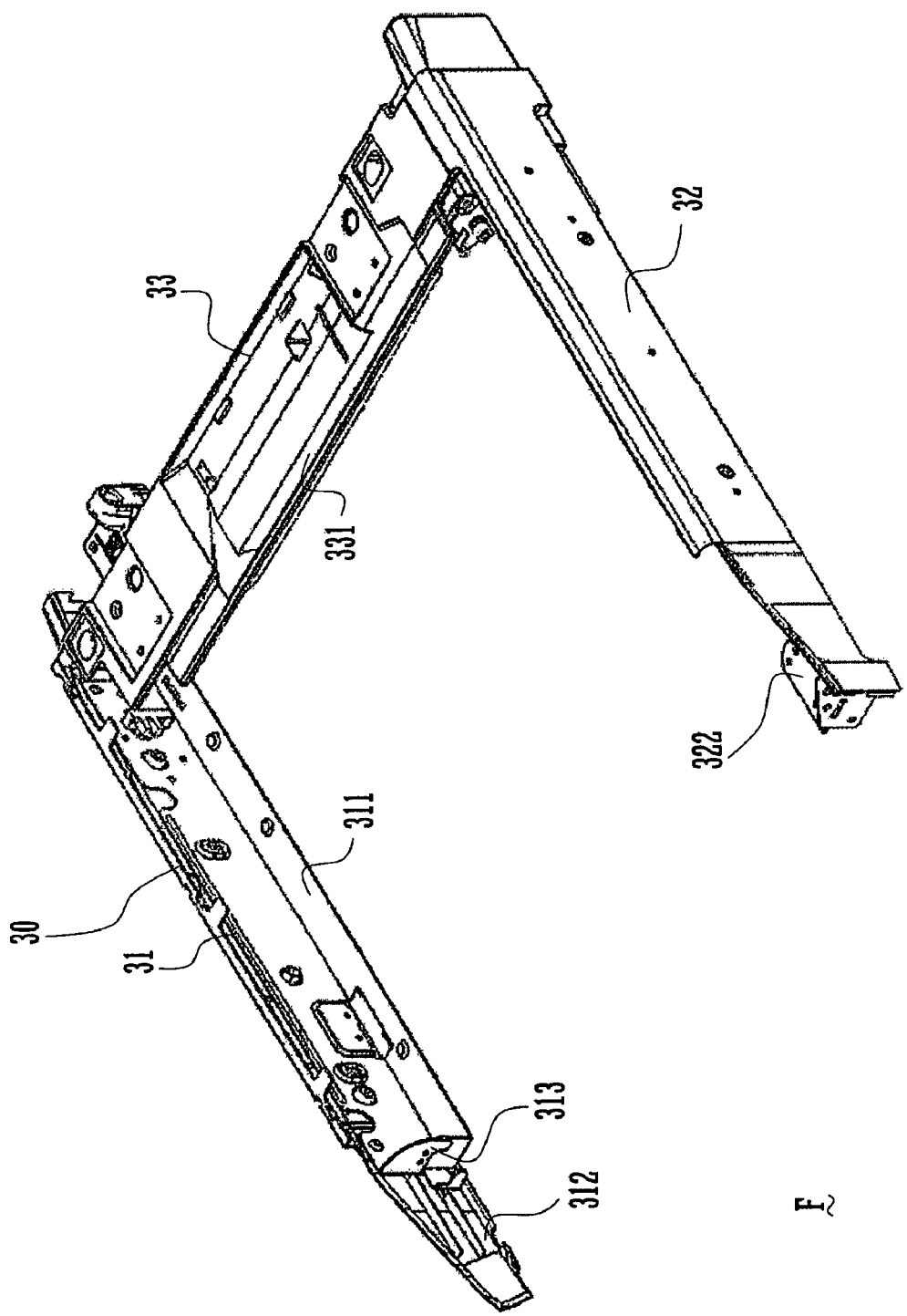
FIG. 3 is a perspective view of the frame.
Figure 4:
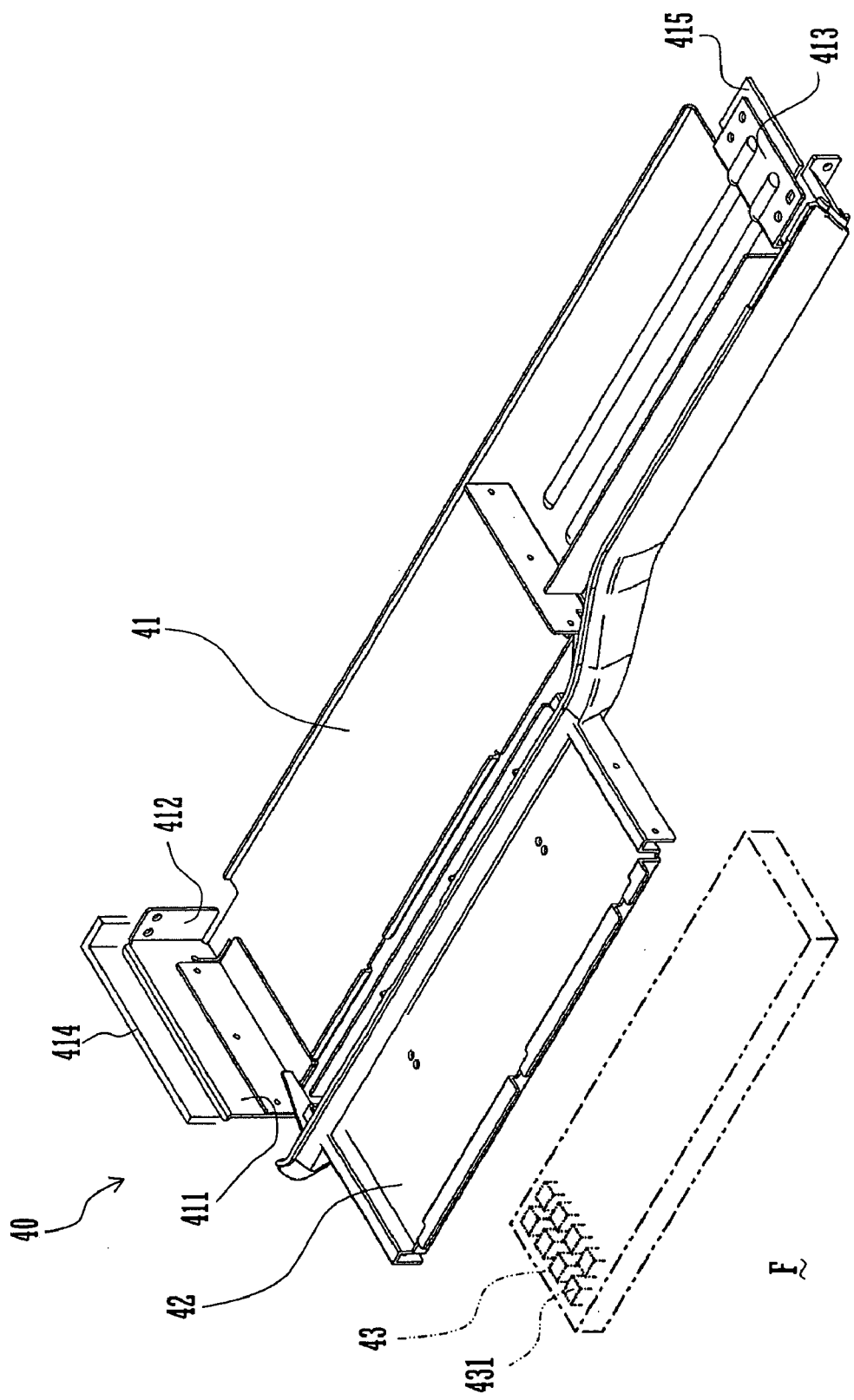
FIG. 4 is a perspective view of the operating unit.

FIG. 2 shows a frame 30 and an operating unit 40. FIG. 3 shows the frame 30 and FIG. 4 shows the operating unit 40.

The image reading device 10 includes the frame 30 and the operating unit 40 in addition to the ADF 90 and the image reading section 20.

The frame 30 is formed of a metal and includes a left frame 31, a right frame 32, and a rear frame 33. The frame 30 is substantially U-shaped in such a manner that the left frame 31, right frame 32 and rear frame 33 form three sides of a rectangle. As shown in FIG. 1, the frame 30 including the left frame 31 and the right frame 32 is fixed on top of the body frames 201 and 202.

The left frame 31 has a seat portion 311 horizontally projecting toward the right frame 32. The right frame 32 has a seat portion horizontally projecting toward the left frame 31. The rear frame 33 has a seat portion 331 horizontally projecting toward front side F. The image reading section 20 is supported on the seat portions of respective of the left frame 31, right frame 32 and rear frame 33 via a non-illustrated intervening cushion member.

The left frame 31 has an extension portion 312 and a first support portion 313. The extension portion 312 is a plate-shaped portion positioned vertically and extended from a front end portion of the left frame 31 toward front side F. The first support portion 313 is located at a base portion of the extension portion 312 and positioned vertically in a direction perpendicular to the extension portion 312.

The right frame 32 has a front end portion on the front side F which is formed with a second support portion 322 horizontally projecting toward the left frame 31.

The operating unit 40 includes an operating unit body 41, a keyboard tray 42, and a keyboard 43. The operating unit 40 is supported on the frame 30.

The keyboard 43 has a plurality of input keys 431 adapted to receive an input operation for controlling the image reading section 20. The keyboard 43 is placed on the keyboard tray 42. The keyboard tray 42 and the keyboard 43 form the operating section defined by the present invention.

The operating unit body 41 has an upright portion 411, a first fixing portion 412, and a second fixing portion 413. The upright portion 411 stands at an end of the operating unit body 41 which lies on the side facing the left frame 31 and extends parallel with the extension portion 312 of the left frame 31. The first fixing portion 412 is located at the end of the operating unit body 41 which lies on the side facing the left frame 31 and extends parallel with the first support portion 313. The second fixing portion 413 is located at an end of the operating unit body 41 which lies on the side facing the right frame 32 and extends horizontally.

When the operating unit body 41 is mounted on the frame 30, the extension portion 312 abuts the upright portion 411 to restrict movements of the operating unit body 41 to the right and left. The first support portion 313 abuts the first fixing portion 412 to restrict forward and rearward movements of the operating unit body 41. The first fixing portion 412 is fixedly screwed to the first support portion 313. The second support portion 322 underlies the second fixing portion 413 to restrict vertical movements of the operating unit body 41. The second fixing portion 413 is fixedly screwed to the second support portion 322.

Since the operating unit 40 is supported on the frame 30, transmission of vibrations caused by depression of input key 431 to the image reading section 20 can be suppressed.

A first vibration absorbing member 414 is provided between the extension portion 312 and the upright portion 411 and between the first support portion 313 and the first fixing portion 412. A second vibration absorbing member 415 is provided between the second support portion 322 and the second fixing portion 413. Transmission of vibrations caused by depression of input key 431 to the image reading section 20 can be further suppressed by the first and second vibration absorbing members 414 and 415.

Figure 5:
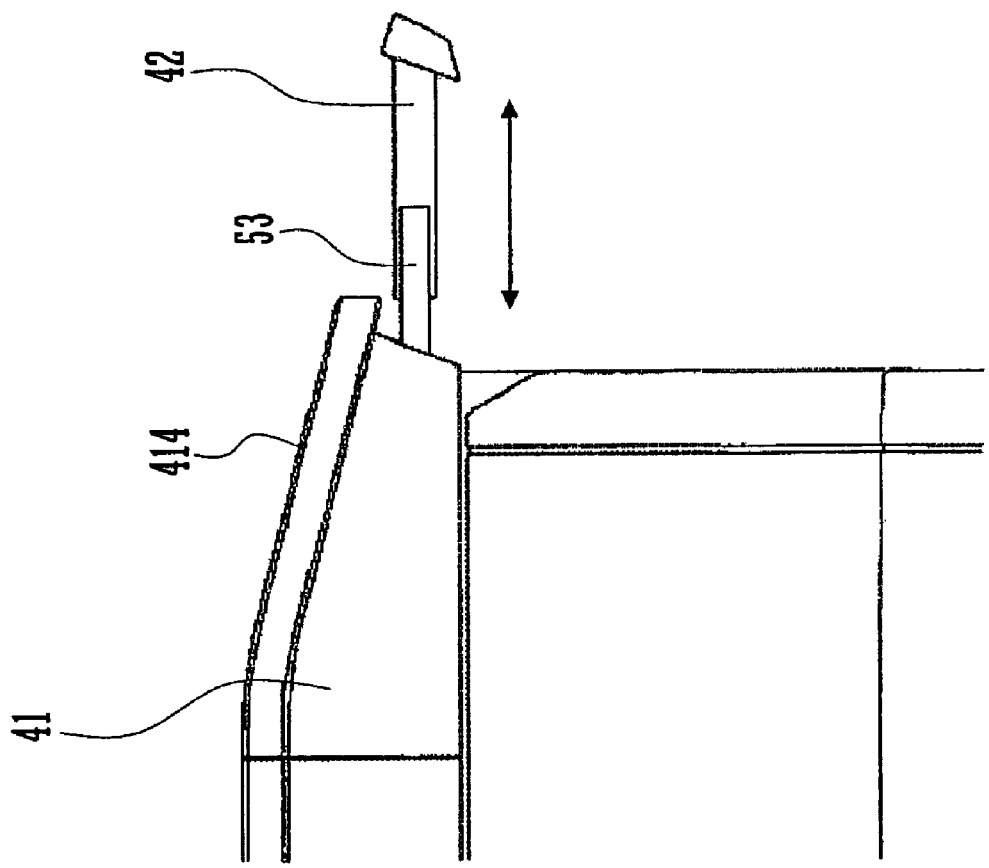
FIG. 5 is a fragmentary side elevational view of the image reading device.
Figure 6:
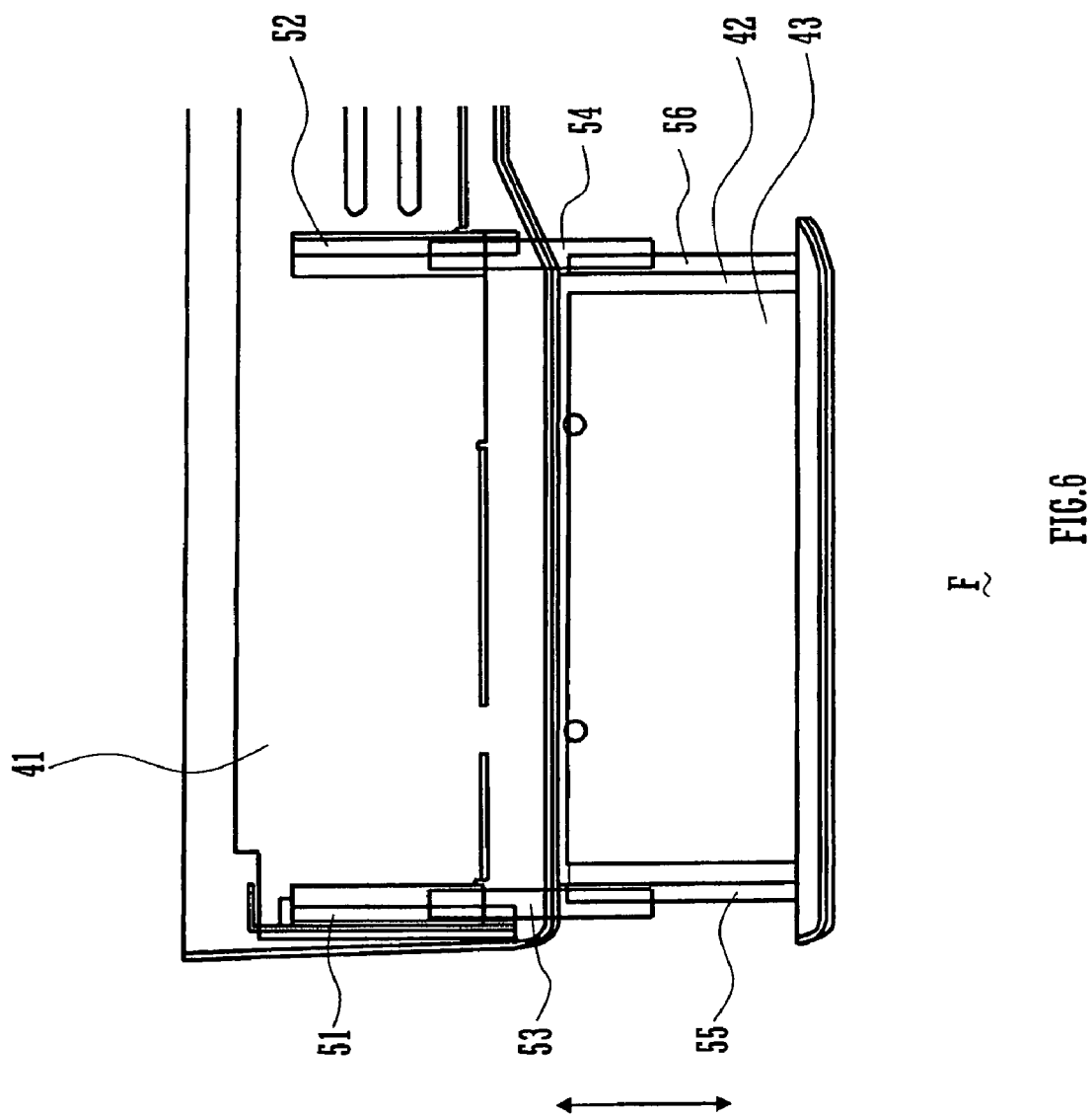
FIG. 6 is a fragmentary plan view of the image reading device.

FIG. 5 is a fragmentary side elevational view of the image reading device 10 and FIG. 6 is a fragmentary plan view of the image reading device 10.

The keyboard tray 42 is supported by the operating unit body 41 so as to be displaceable between a predetermined drawn-out position in which the input keys 431 are exposed to the outside and a predetermined housed position in which the input keys 431 are housed inside. In the drawn-out position the keyboard tray 42 projects horizontally.

The operating unit body 41 has a first left rail 51 and a first right rail 52 between which is defined a spacing matching the width of the keyboard tray 42.

The first left rail 51 supports a left coupling member 53 for forward and rearward sliding movements. The first right rail 52 supports a right coupling member 54 for forward and rearward sliding movements.

The keyboard tray 42 has a second left rail 55 and a second right rail 56. The left coupling member 53 supports the second left rail 55 for forward and rearward sliding movements. The right coupling member 54 supports the second right rail 56 for forward and rearward sliding movements.

This arrangement allows the keyboard tray 42 to be displaced between the drawn-out position and the housed position.

The combination of the first left rail 51 and the left coupling member 53, the combination of the first right rail 52 and the right coupling member 54, the combination of the left coupling member 53 and the second left rail 55 and the combination of the right coupling member 54 and the second right rail 56 are each provided with first engagement structures which engage each other to prevent the keyboard tray 42 from being drawn out beyond the drawn-out position, as well as second engagement structures which engage each other to prevent the keyboard tray 42 from being inserted deeper than the housed position.

The keyboard tray 42 and the operating unit body 41 are provided with a locking mechanism for locking the keyboard tray 42 in the housed position while unlocking the keyboard tray 42 when a force having a predetermined value or higher is exerted on the keyboard tray 42 in the draw-out direction.

An input section including an operating display section, such as a liquid crystal touch panel, a ten-key pad and a start key is fixedly placed on a top surface 414 of the operating unit body 41.

Since the keyboard tray 42 is displaceable between the drawn-out position and the housed position, it is possible to allow the keyboard 43 to coexist with the input section fixedly placed on the top surface 414 while limiting the growth in the size of the image reading device 10. Since the number of input keys can be thus increased, with the growth in the size of the image reading device 10 being limited, it becomes possible to simplify the input operation.

Figure 7A:
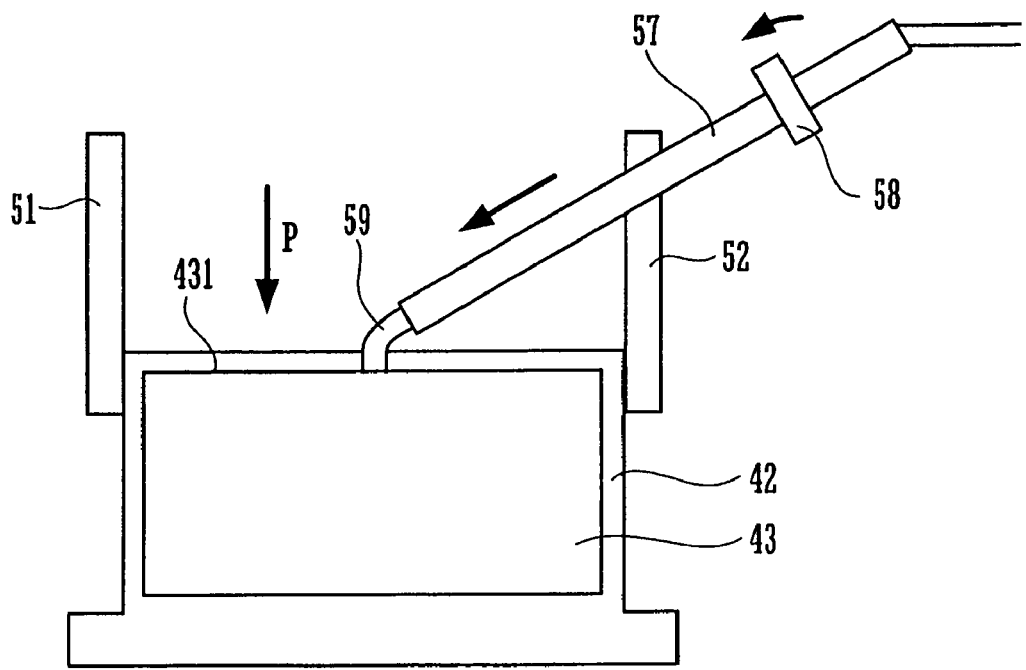
FIGS. 7A and 7B are each a sectional plan view showing a part of the image reading device; specifically.
Figure 7B:
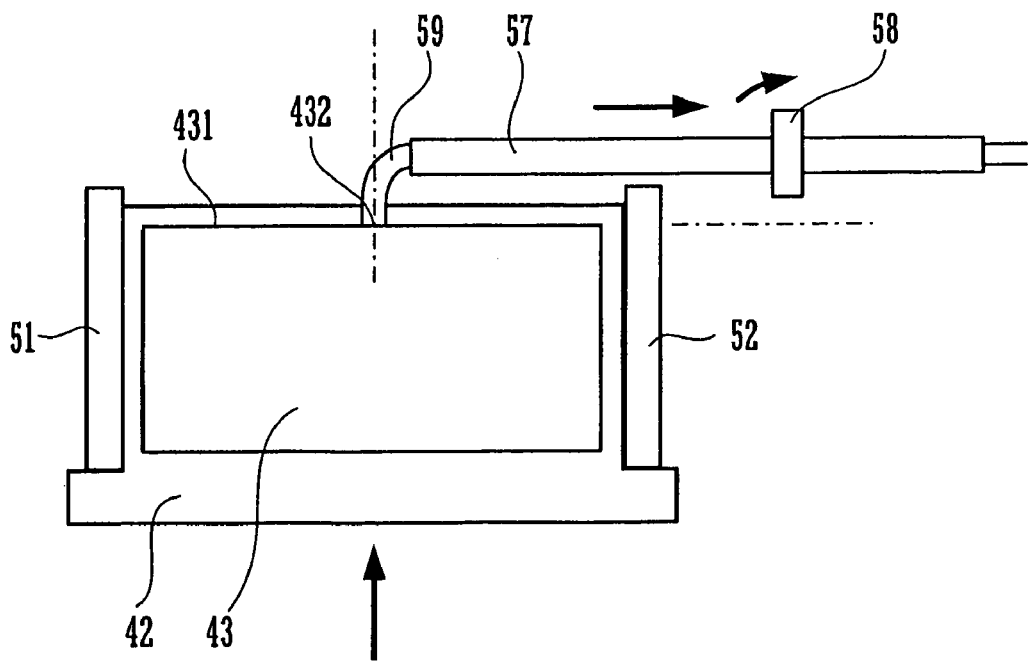

FIGS. 7A and 7B are each a sectional plan view showing a part of the image reading device 10; specifically, FIG. 7A shows the keyboard tray 42 in the drawn-out position, while FIG. 7B shows the keyboard tray 42 in the housed position.

The operating unit 40 further includes a tubular member 57 and a rotary member 58.

The tubular member 42 covers an electric cord 59 connected to an upstream end portion 431 of the keyboard 43 which lies on the downstream side in a draw-out direction P in which the keyboard tray 42 is capable of being drawn out. The tubular member 57 has a predetermined length and such a rigidity as not bend when the keyboard tray 42 is displaced.

The rotary member 58 is rotatably supported on the operating unit body 41 in a horizontal plane at a location upstream of the upstream end portion 431 of the keyboard 43 in the housed position in the draw-out direction, which location fails to coincide with a connection point 432 between the electric cord 59 and the keyboard 43 in the draw-out direction. The rotary member 58 defines a bore 581 therethrough which allows the tubular member 57 to extend therethrough slidably.

When the keyboard tray 42 is displaced between the drawn-out position and the housed position, the tubular member 57 slides through the bore 581 of the rotary member 58 without bending. Therefore, the electric cord 59 fails to bend, hence, fails to rub the members present therearound. For this reason, it is possible to suppress vibrations which are caused by rubbing by the electric cord 59 when the keyboard tray 42 is displaced, as well as to prevent the electric cord 59 from being damaged. Further, since a large space for preventing the electric cord 59 from rubbing is not necessary, the image reading device 20 can be reduced in size.

The foregoing embodiment is illustrative in all points and should not be construed to limit the present invention. The scope of the present invention is defined not by the foregoing embodiment but by the following claims. Further, the scope of the present invention is intended to include all modifications within the scopes of the claims and within the meanings and scopes of equivalents.

What is claimed is:

1. An image forming apparatus comprising:
an image reading device comprising:
an image reading section configured to obtain image data by reading an image of a document;
a frame supporting the image reading section; and
an operating unit having an operating section including a plurality of input keys adapted to receive an input operation for controlling the image reading section, and an operating unit body supporting the operating section for displacement between a drawn-out position in which the input keys are exposed to outside and a housed position in which the input keys are housed inside,
the operating unit being supported by the frame, and
an image forming unit configured to form an image on a recording medium based on the image data obtained by the image reading section, wherein
the frame includes a left frame and a right frame that are formed of a metal;
the left frame and the right frame include:
a plate-shaped portion positioned vertically and extended in a displace direction of the operating section; and
a seat portion horizontally projecting from the plate-shaped portion and supporting the image reading section, and
the left frame and the right frame are fixed on top of body frames of the image forming unit; and
the operating unit further comprising:
a tubular member having a predetermined length and jacketing an electric cord connected to an upstream end portion of the operating section in a draw-out direction in which the operating section is capable of being drawn out, the tubular member having such a rigidity as not bend when the operating section is displaced; and a rotary member supported on the operating unit body rotatably in a horizontal plane at a location upstream of the upstream end portion of the operating section in the housed position in the draw-out direction, which location fails to coincide with a connection point between the electric cord and the operating section in the draw-out direction, the rotary member defining a bore there through which allows the tubular member to extend there through slidably.

2. The image forming apparatus according to claim 1, wherein the drawn-out position is a position to which the operating section projects horizontally.

3. The image forming apparatus according to claim 1, wherein a vibration absorbing member is provided between the operating unit and the frame.

* * * * *